United States Patent
Sasaki et al.

(10) Patent No.: US 10,464,241 B2
(45) Date of Patent: Nov. 5, 2019

(54) STEREOSCOPIC MODELING APPARATUS, METHOD OF MANUFACTURING STEREOSCOPIC MODELED PRODUCT, AND NON-TRANSITORY RECORDING MEDIUM

(71) Applicants: Takafumi Sasaki, Kanagawa (JP); Takeo Yamaguchi, Kanagawa (JP)

(72) Inventors: Takafumi Sasaki, Kanagawa (JP); Takeo Yamaguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 841 days.

(21) Appl. No.: 14/968,967

(22) Filed: Dec. 15, 2015

(65) Prior Publication Data
US 2016/0214320 A1    Jul. 28, 2016

(30) Foreign Application Priority Data

Jan. 27, 2015 (JP) ................... 2015-013550
Mar. 27, 2015 (JP) ................... 2015-067371

(51) Int. Cl.
*B29C 64/165* (2017.01)
*B29C 45/00* (2006.01)
(Continued)

(52) U.S. Cl.
CPC ........ *B29C 45/0013* (2013.01); *B29C 64/165* (2017.08); *B33Y 10/00* (2014.12);
(Continued)

(58) Field of Classification Search
CPC . B29C 64/165; B29C 64/218; B29L 2009/00; B33Y 10/00; B33Y 30/00; B33Y 40/00; B22F 3/008
See application file for complete search history.

(56) References Cited

U.S. PATENT DOCUMENTS 5,387,380 A * 2/1995 Cima ................. B05C 19/04
                                                 264/109
6,036,777 A   3/2000 Sachs
(Continued)

FOREIGN PATENT DOCUMENTS

JP    S63141724 A    6/1988
JP    6-218712       8/1994
(Continued)

OTHER PUBLICATIONS

Yuan, Y. et al., "Contact Angle and Wetting Properties," Surface Science Techniques, pp. 3-34, Jan. 1, 2013.
(Continued)

*Primary Examiner* — Edmund H Lee
*Assistant Examiner* — Joseph S Leyson
(74) *Attorney, Agent, or Firm* — Harness, Dickey & Pierce, P.L.C.

(57) ABSTRACT

A stereoscopic modeling apparatus including a modeling part, a modeling unit, and a controller is provided. The modeling part forms a powder layer with a powder. The modeling unit discharges droplets of a modeling liquid on the powder layer to form a modeling layer in which particles of the powder are bonded. The controller causes the modeling part and the modeling unit to repeat forming the powder layer and the modeling layer, respectively, to sequentially laminate the modeling layer to form a stereoscopic modeled product. The droplets include a preceding droplet and a succeeding droplet sequentially discharged to adjacent positions on the powder layer, and the succeeding droplet is discharged after the preceding droplet is discharged and within a time period in which a contact angle between the preceding droplet impacted on the powder layer and the powder in the powder layer remains greater than 90 degrees.

9 Claims, 13 Drawing Sheets

(51) Int. Cl.
     *B33Y 10/00*        (2015.01)
     *B33Y 40/00*        (2015.01)
     *B33Y 30/00*        (2015.01)
     *B29L 9/00*         (2006.01)
     *B22F 3/00*         (2006.01)

(52) U.S. Cl.
     CPC ............... *B33Y 40/00* (2014.12); *B22F 3/008* (2013.01); *B29L 2009/00* (2013.01); *B33Y 30/00* (2014.12)

(56) References Cited

U.S. PATENT DOCUMENTS

| | | |
|---|---|---|
| 2009/0020920 A1 | 1/2009 | Kumagai et al. |
| 2015/0331186 A1* | 11/2015 | Peltz .................... G02B 6/1221 385/14 |
| 2015/0343533 A1 | 12/2015 | Park et al. |
| 2016/0160021 A1* | 6/2016 | Kojima ............... B29C 67/0081 428/201 |
| 2016/0243765 A1* | 8/2016 | Sasaki ................ B29C 67/0081 |

FOREIGN PATENT DOCUMENTS

| | | |
|---|---|---|
| JP | 2005-297325 A | 10/2005 |
| WO | WO93/25336 A1 | 12/1993 |

OTHER PUBLICATIONS

Extended European Search Report dated Jun. 15, 2016.
Japanese Office Action dated Dec. 4, 2018. for JP 2015-067371.

* cited by examiner

300 × 300dpi

300 × 600dpi

600 × 600dpi

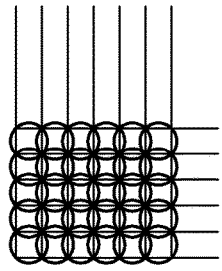
FIG. 15A
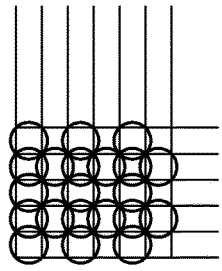
FIG. 15B
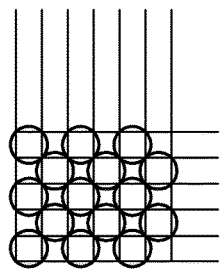
FIG. 15C
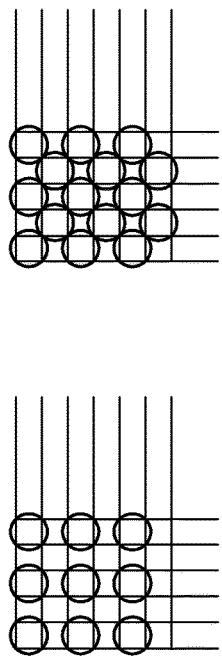
FIG. 15D
600 × 600dpi
FIG. 16
| FREQUENCY | MAIN SCANNING SPEED | 1 scan TIME INTERVAL | 2 scan TIME INTERVAL | TIME REQUIRED FOR ONE SCANNING WHEN MAIN SCANNING DISTANCE IS 300 mm |
|---|---|---|---|---|
| kHz | m/s | us | s | s |
| 2 | 0.1693 | 500 | 3.545 | 3.54 |
| 4 | 0.3386 | 250 | 1.772 | 1.77 |
| 6 | 0.5079 | 167 | 1.182 | 1.18 |
| 8 | 0.6772 | 125 | 0.886 | 0.89 |
| 10 | 0.8465 | 100 | 0.709 | 0.71 |
| 12 | 1.0158 | 83 | 0.591 | 0.59 |
| 14 | 1.1851 | 71 | 0.506 | 0.51 |
| 16 | 1.3544 | 63 | 0.443 | 0.44 |
| 18 | 1.5237 | 56 | 0.394 | 0.39 |
| 20 | 1.693 | 50 | 0.354 | 0.35 |

| COMBINATION | CONTACT ANGLE (degree) 3.5 sec | DENSITY (g/cc) |
|---|---|---|
| A | 87.37 | 3.49 |
| B | 87.64 | 3.40 |
| C | 94.17 | 4.33 |
| D | 112.7 | 3.84 |
| E | 97.46 | 4.39 |

STEREOSCOPIC MODELING APPARATUS, METHOD OF MANUFACTURING STEREOSCOPIC MODELED PRODUCT, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application Nos. 2015-013550 and 2015-067371, filed on Jan. 27, 2015 and Mar. 27, 2015, respectively, in the Japan Patent Office, the entire disclosure of each of which is hereby incorporated by reference herein.

BACKGROUND

Technical Field

The present disclosure relates to a stereoscopic modeling apparatus, a method of manufacturing a stereoscopic modeled product, and a non-transitory recording medium.

Description of the Related Art

As a stereoscopic modeling apparatus (or three-dimensional modeling apparatus) for modeling stereoscopic modeled products (or three-dimensional modeled products), an apparatus employing additive manufacturing is known. Such an apparatus employing additive manufacturing forms a stereoscopic modeled product by laminating modeling layers. One example of the additive manufacturing includes repeating the steps of forming a flattened metal or non-metal powder layer on a modeling stage, discharging a modeling liquid on the powder layer to form a thin modeling layer in which the powder particles are bonded, and forming another powder layer again on the modeling layer.

SUMMARY

In accordance with some embodiments of the present invention, a stereoscopic modeling apparatus is provided. The stereoscopic modeling apparatus includes a modeling part, a modeling unit, and a controller. The modeling part forms a powder layer with a powder. The modeling unit discharges droplets of a modeling liquid on the powder layer to form a modeling layer in which particles of the powder are bonded. The controller causes the modeling part and the modeling unit to repeat forming the powder layer and the modeling layer, respectively, to sequentially laminate the modeling layer to form a stereoscopic modeled product. The droplets include a preceding droplet and a succeeding droplet sequentially discharged to adjacent positions on the powder layer, and the succeeding droplet is discharged after the preceding droplet is discharged and within a time period in which a contact angle between the preceding droplet impacted on the powder layer and the powder in the powder layer remains greater than 90 degrees.

In accordance with some embodiments of the present invention, a method of manufacturing a stereoscopic modeled product is provided. The method includes the steps of: forming a powder layer with a powder; discharging droplets of a modeling liquid on the powder layer to form a modeling layer in which particles of the powder are bonded; and repeating the forming and the discharging to sequentially laminate the modeling layer to form the stereoscopic modeled product. In the method, the droplets include a preceding droplet and a succeeding droplet sequentially discharged to adjacent positions on the powder layer, and the succeeding droplet is discharged after the preceding droplet is discharged and within a time period in which a contact angle between the preceding droplet impacted on the powder layer and the powder in the powder layer remains greater than 90 degrees.

In accordance with some embodiments of the present invention, a non-transitory recording medium is provided. The non-transitory recording medium stores a plurality of instructions which, when executed by one or more processors, cause the processors to perform the above method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 15A to 15D are illustrations of the resolution for explaining the time interval between a preceding droplet and a succeeding droplet to impact on adjacent positions on a powder layer;

FIG. 16 is a table showing various time intervals when the drive frequency is varied;

Figure 1:
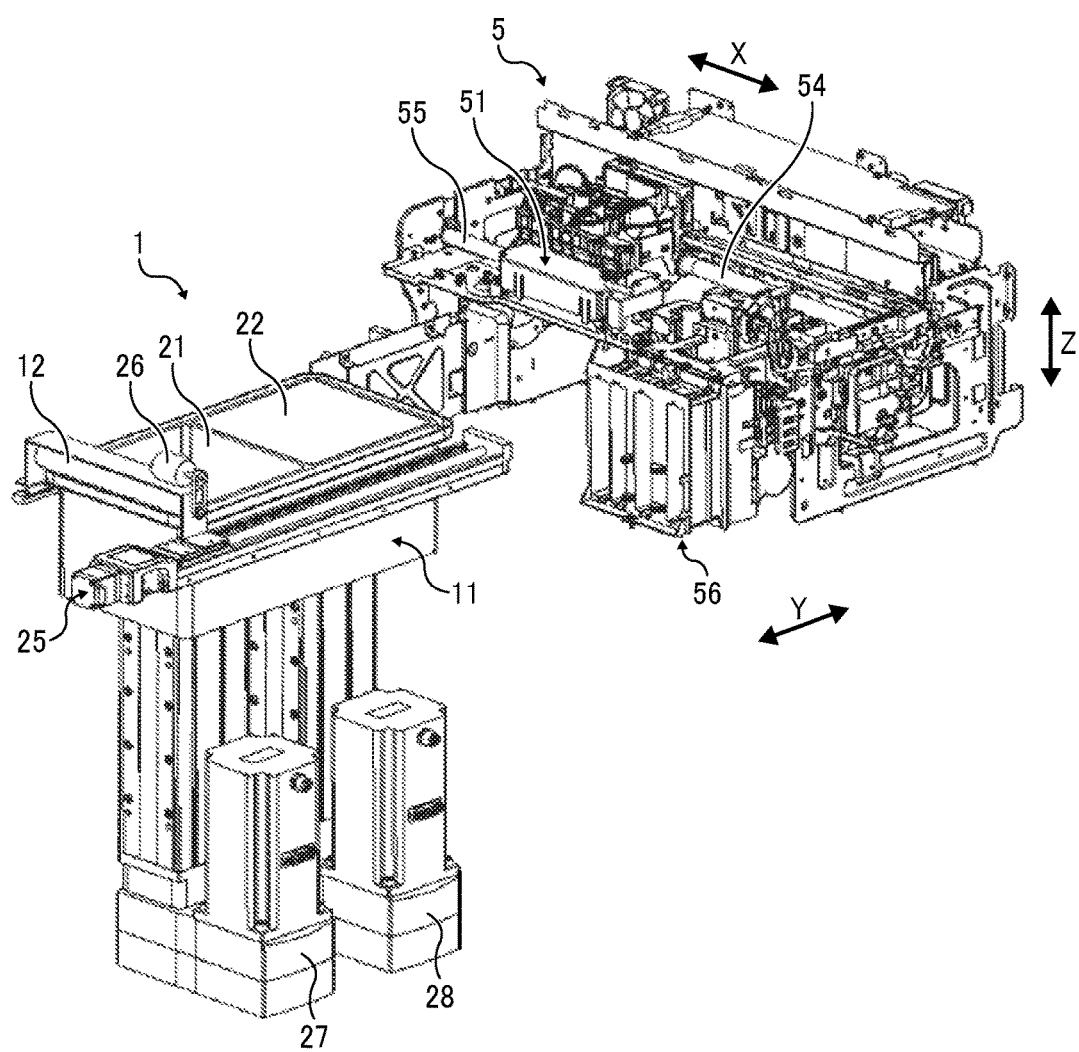
FIGS. 1 and 2 are perspective view and side view, respectively, of the major part of a stereoscopic modeling apparatus according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In additive manufacturing, a thin powder layer is generally formed by a leveling mechanism such as a squeegee. Therefore, there is a limit in increasing the powder density of the powder layer. The upper limit of the powder density is generally equivalent to the loose bulk density of the powder.

Upon impact of a droplet of a bonding liquid, the powder particles are caused to migrate due to liquid bridge adhesive force. Thus, dense portions and sparse portions in which the powder density is relatively high and low, respectively, randomly appear. As a result, disadvantageously, the resulting modeled product may locally contain voids, be nonuniform in density, and have poor quality.

In view of this situation, one object of the present invention is to provide a modeled product having an improved quality.

In accordance with some embodiments of the present invention, a modeled product having an improved quality is provided.

Figure 2:
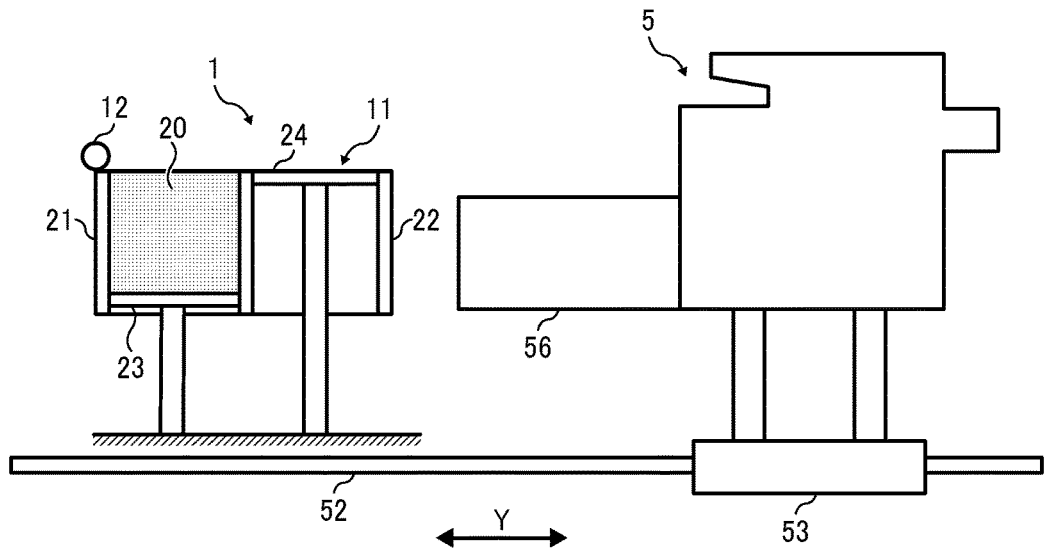
Figure 3:
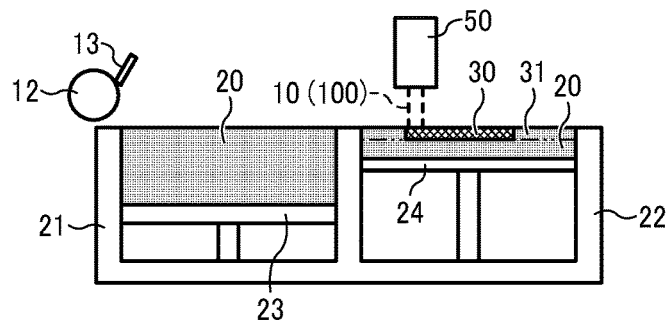
FIGS. 3 and 4 are cross-sectional view and perspective view, respectively, of the modeling part of the stereoscopic modeling apparatus.
Figure 4:
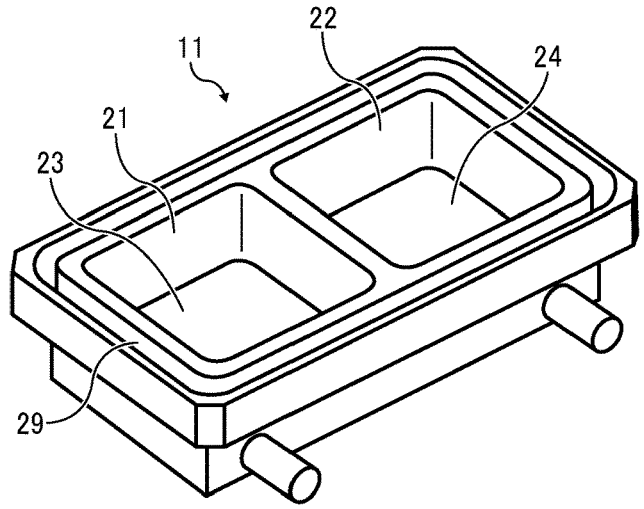

A stereoscopic modeling apparatus in accordance with a first embodiment of the present invention is described below with reference to FIGS. 1 to 4. FIGS. 1 and 2 are perspective view and side view, respectively, of the major part of the stereoscopic modeling apparatus. FIGS. 3 and 4 are cross-sectional view and perspective view, respectively, of the modeling part of the stereoscopic modeling apparatus. In FIG. 3, the modeling part is in a modeling operation status.

This stereoscopic modeling apparatus is of a powder modeling apparatus. The stereoscopic modeling apparatus includes a modeling part 1 at which a modeling layer 30 in which powder particles are bonded is formed, and a modeling unit 5 to discharge a modeling liquid 10 to the modeling part 1 to model a stereoscopic modeled product.

The modeling part 1 includes a powder tank 11 and a flattening roller 12 that is a rotor serving as a flattening unit. (The flattening roller may also be referred to as the recoater roller.)

The powder tank 11 includes a supplying tank 21 to supply a powder 20 and a modeling tank 22 to model a modeled product. A bottom part of the supplying tank 21 is freely movable up and down in the vertical direction (height direction) as a supplying stage 23. Similarly, a bottom part of the modeling tank 22 is freely movable up and down in the vertical direction (height direction) as a modeling stage 24. A stereoscopic modeled product is modeled on the modeling stage 24.

The supplying stage 23 is lifted up and down by a motor 27, and the modeling stage 24 is lifted up and down by a motor 28.

The flattening roller 12 supplies the powder 20 that has been supplied on the supplying stage 23 of the supplying tank 21 to the modeling tank 22, and flattens the supplied powder 20 to form a powder layer 31, to be described in detail later. A reciprocating mechanism 25 causes the flattening roller 12 to reciprocate relative to the surface of the modeling stage 24, on which the powder 20 is to be placed, in the direction indicated by arrow Y along the stage surface of the modeling stage 24. The flattening roller 12 is rotary-driven by a motor 26.

The modeling unit 5 includes a discharge unit 51 having at least one liquid discharge head 50 (hereinafter may be referred to as "head 50" for simplicity) to discharge the modeling liquid 10 on the powder layer 31 on the modeling stage 24, as illustrated in FIG. 3.

The discharge unit 51 includes multiple heads each discharging a cyan modeling liquid, a magenta modeling liquid, an yellow modeling liquid, a black modeling liquid, and a clear modeling liquid. Multiple tanks each storing the cyan modeling liquid, the magenta modeling liquid, the yellow modeling liquid, the black modeling liquid, or the clear modeling liquid are mounted on a tank mounting unit 56.

The modeling unit 5 further includes a head cleaning mechanism (i.e., a cleaner 555 illustrated in FIG. 5) for cleaning the discharge unit 51.

The head cleaning mechanism includes a cap and a wiper. The cap is brought into intimate contact with the surface of a nozzle plate disposed on a lower part of the head to suck the modeling liquid from the nozzles. Thus, powder particles clogging the nozzles and the highly-viscous modeling liquid can be discharged. The surface of the nozzle plate is then wiped so as to form a meniscus of the nozzles. (The inside of the nozzle is in a negative pressure state.) The head cleaning mechanism prevents, while discharging of the modeling liquid is suspended, intrusion of the powder into the nozzles and drying of the modeling liquid.

As illustrated in FIG. 2, the modeling unit 5 includes a guide 52 and a slider 53 movably supported by the guide 52. The modeling unit 5 as a whole is reciprocatable in the direction indicated by arrow Y (i.e., sub-scanning direction). A scanning mechanism, including a motor 552 to be described in detail later, causes the modeling unit 5 to reciprocate in the direction indicated by arrow Y.

The discharge unit 51 is supported by guides 54 and 55 to be reciprocatable in the direction indicated by arrow X (i.e., main scanning direction). Another scanning mechanism, including a motor 550 to be described in detail later, causes the discharge unit 51 to reciprocate in the direction indicated by arrow X.

The discharge unit 51, along with the guides 54 and 55, is supported to be movable up and down in the direction indicated by arrow Z. A lifting mechanism, including a motor 551 to be described in detail later, causes the discharge unit 51 to move up and down in the direction indicated by arrow Z.

The modeling part 1 is described in detail below with reference to FIGS. 3 and 4.

The powder tank 11 has a box-like shape and includes the supplying tank 21 and the modeling tank 22, the upper face of each of which is opened. The supplying stage 23 and the modeling stage 24 are disposed inside the supplying tank 21 and the modeling tank 22, respectively, and are movable up and down.

The side surfaces of the supplying stage 23 are in contact with the inner surfaces of the supplying tank 21. The side surfaces of the modeling stage 24 are in contact with the inner surfaces of the modeling tank 22. The upper surfaces of the supplying stage 23 and the modeling stage 24 are remained horizontal.

Around the powder tank 11, a powder dropping port 29, in a convex shape with its upper face opened, is disposed, as illustrated in FIG. 4. (The powder dropping port 29 is omitted in FIG. 3.) A surplus of the powder 20, accumulated by the flattening roller 12 during formation of a powder layer, drops to the powder dropping port 29. The surplus of the powder 20 dropped to the powder dropping port 29 is returned to a powder supply part that supplies powder to the supplying tank 21.

Figure 5:
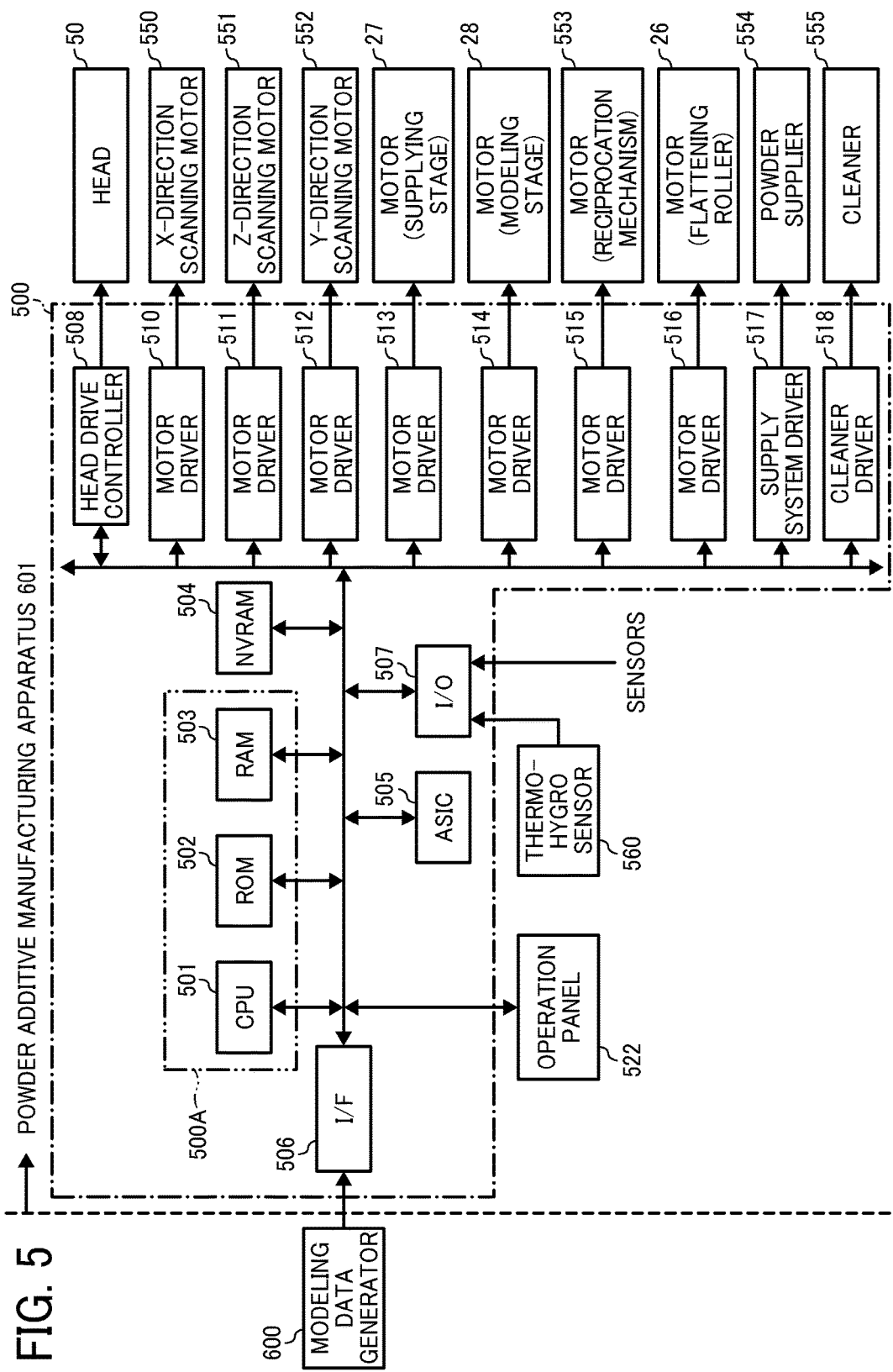
FIG. 5 is a block diagram of the controller of the stereoscopic modeling apparatus.

A powder supplier 554 illustrated in FIG. 5 (omitted in FIG. 1) is in a tank-like shape and disposed on the upper side of the supplying tank 21. The powder supplier 554 supplies powder from its tank to the supplying tank 21 at the time of initial modeling operation or when the amount of powder in the supplying tank 21 has been decreased. Specific methods of supplying powder include, but are not limited to, screw conveyer methods and air transport methods.

The flattening roller 12 has a function of transporting and supplying the powder 20 from the supplying tank 21 to the modeling tank 22 to form the powder layer 31 having a predetermined thickness.

The flattening roller 12 is a rod-like member longer than the inside dimension of the modeling tank 22 and the supplying tank 21 (i.e., the width of the powder supplying part and the powder storing part). The reciprocating mechanism 25 causes the flattening roller 12 to reciprocate in the direction indicated by arrow Y and parallel to the stage surface.

The flattening roller 12 horizontally moves passing over the outer side of the supplying tank 21 and then the upper side of the supplying tank 21 and the modeling tank 22, while being rotated by the motor 26. By this movement, the powder 20 is transported and supplied to the modeling tank 22.

As illustrated in FIG. 3, a powder removing plate 13 is disposed in contact with the flattening roller 12. The powder removing plate 13 removes the powder 20 adhered to the flattening roller 12.

The powder removing plate 13 moves along with the flattening roller 12 while remaining in contact with the peripheral surface of the flattening roller 12. The powder removing plate 13 is disposed so as to face in the direction of rotation of the flattening roller 12 which is in the flattening operation.

According to the present embodiment, in the modeling part 1, the powder tank 11 includes two tanks, i.e., the supplying tank 21 and the modeling tank 22. According to another embodiment, the powder tank 11 may include the modeling tank 22 only. In this case, powder may be supplied to the modeling tank 22 from the powder supplier and flattened by a flattening unit.

A controller of the above stereoscopic modeling apparatus is described below with reference to FIG. 5. FIG. 5 is a block diagram of the controller.

A controller 500 includes a main controller 500A including a central processing unit (CPU) 501 to control the overall stereoscopic modeling apparatus, a read only memory (ROM) 502 to store a program which causes the CPU 501 to execute a processing in accordance with an embodiment of the present invention and other fixed data, and a random access memory (RAM) 503 to temporarily store image data (print data) and the like.

The controller 500 includes a non-volatile random access memory (NVRAM) 504 to hold data even when the power to the apparatus is cut off. The controller 500 includes an application specific integrated circuit (ASIC) 505 to execute an image processing which processes various signals corresponding to image data and to process input and output signals for controlling the overall apparatus.

The controller 500 includes an interface (IF) 506 to transmit and receive data and signals used for receiving modeling data from an external modeling data generator 600. The modeling data generator 600 generates modeling data of the final shape of the modeled product that is sliced into multiple modeling layers. The modeling data generator 600 includes an information processing apparatus such as a personal computer.

The controller 500 includes an input/output device (I/O) 507 to incorporate various sensor detection signals.

The controller 500 includes a head drive controller 508 to drive-control each head 50 of the discharge unit 51.

The controller 500 includes a motor driver 510 to drive the motor 550 (hereinafter "X-direction scanning motor 550") that causes the discharge unit 51 to move in the direction indicated by arrow X, and a motor driver 512 to drive the motor 552 (hereinafter "Y-direction scanning motor 552") that causes the modeling unit 5 to move in the direction indicated by arrow Y.

The controller 500 includes a motor driver 511 to drive the motor 551 (hereinafter "Z-direction lifting motor 551") that causes the discharge unit 51 to move up and down in the direction indicated by arrow Z. According to another embodiment, the modeling unit 5 as a whole may be configured to be lifted up and down in the direction indicated by arrow Z.

The controller 500 includes a motor driver 513 to drive the motor 27 that causes the supplying stage 23 to move up and down, and a motor driver 514 to drive the motor 28 that causes the modeling stage 24 to move up and down.

The controller 500 includes a motor driver 515 to drive a motor 553 of the reciprocating mechanism 25 that causes the flattening roller 12 to move, and a motor driver 516 to drive the motor 26 that rotary-drives the flattening roller 12.

The controller 500 includes a supply system driver 517 to drive the powder supplier 554 that supplies the powder 20 to the supplying tank 21, and a cleaner driver 518 to drive the cleaner 555 that performs cleaning (i.e., maintenance) of the discharge unit 51.

To the I/O 507 of the controller 500, detection results from a thermo-hygro sensor 560, for detecting temperature and humidity as environmental conditions, and other detection signals from other sensors are input.

The controller 500 is connected to an operation panel 522 for inputting and displaying necessary information for the apparatus.

The stereoscopic modeling apparatus is composed of the modeling data generator 600 and the powder additive manufacturing apparatus 601.

A modeling flow is described below with reference to FIGS. 6A to 6E. FIGS. 6A to 6E are cross-sectional views illustrating a flow of the modeling in accordance with an embodiment of the present invention.

A first modeling layer 30 has been formed on the modeling stage 24 of the modeling tank 22.

Figure 6A:
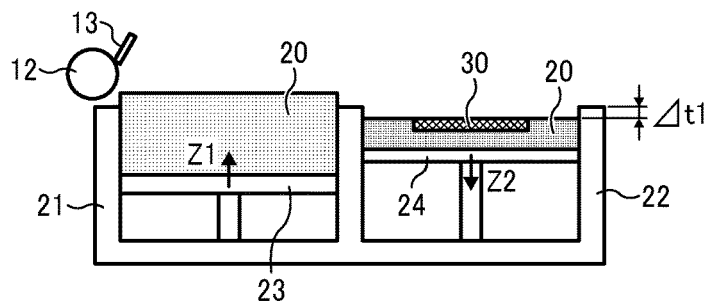
FIGS. 6A to 6E are cross-sectional views illustrating a flow of the modeling in accordance with an embodiment of the present invention.

To form a next modeling layer 30 on the first modeling layer 30, as illustrated in FIG. 6A, the supplying stage 23 of the supplying tank 21 is lifted in the direction indicated by arrow Z1 and the modeling stage 24 of the modeling tank 22 is lowered in the direction indicated by arrow Z2.

The lowering distance of the modeling stage 24 is so determined that the distance between the surface of the powder 20 in the modeling tank 22 and the lower contact-line part of the flattening roller 12 becomes Δt1. The distance Δt1 corresponds to the thickness of a next powder layer 31. Preferably, the distance Δt1 is from several tens to several hundreds of micro-meters.

Figure 6B:
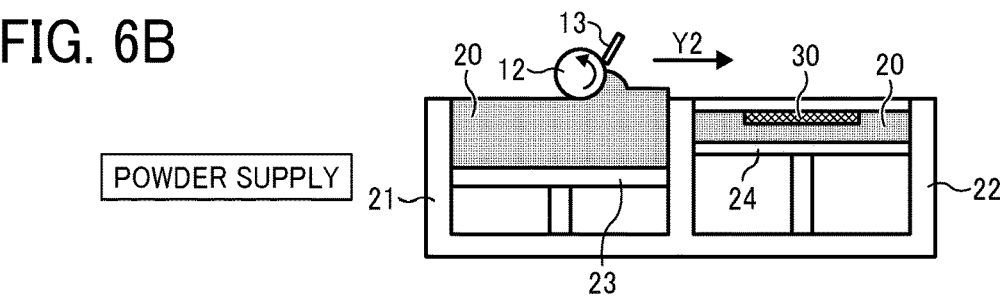

Next, as illustrated in FIG. 6B, a part of the powder 20 positioned above the upper surface level of the supplying tank 21 is moved in the direction indicated by arrow Y2 as the flattening roller 12 rotates in the forward direction (i.e., direction indicated by arrow in the flattening roller 12). Thus, the powder 20 is transported and supplied to the modeling tank 22. This process may be called the powder supply process.

Figure 6C:
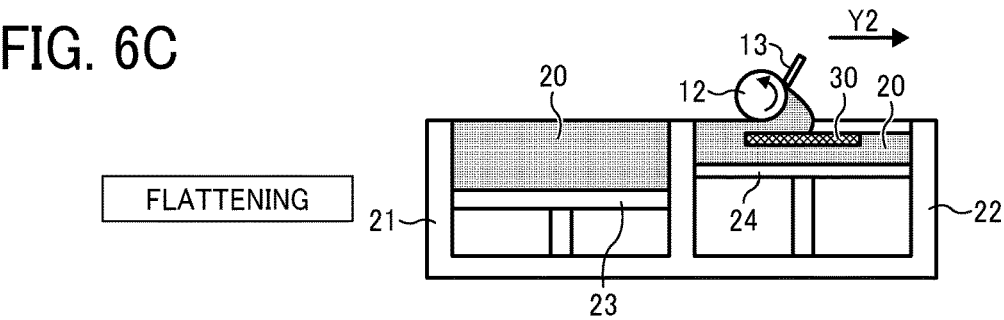
Figure 6D:
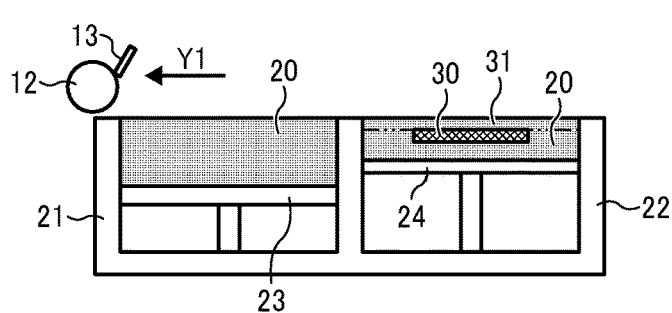

Next, as illustrated in FIG. 6C, the flattening roller 12 is moved in parallel with the stage surface of the modeling stage 24 of the modeling tank 22. Thus, as illustrated in FIG. 6D, the powder layer 31 having the predetermined thickness Δt1 is formed on the modeling layer 30 on the modeling stage 24. This process may be called the flattening process. After the formation of the powder layer 31, the flattening roller 12 is moved in the direction indicated by arrow Y1 to be returned to the initial position.

The flattening roller 12 is configured to move with its distance from the upper surface level of the modeling tank 22 and the supplying tank 21 remaining constant. Owing to this configuration, the flattening roller 12 can form the powder layer 31 having the uniform thickness Δt1 on the modeling tank 22 or the modeling layer 30 already formed, while transporting the powder 20 to the modeling tank 22.

Figure 6E:
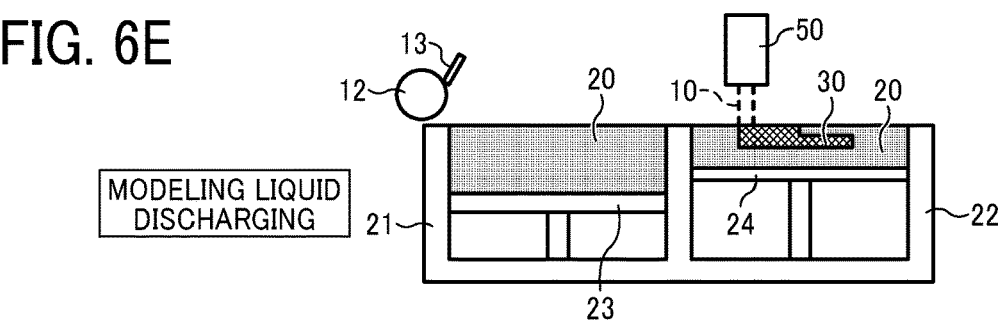

Next, as illustrated in FIG. 6E, the head 50 of the discharge unit 51 discharges the modeling liquid 10 in the form of droplets to form a next modeling layer 30. This process may be called the modeling liquid discharging process.

In the present embodiment, the modeling layer 30 is formed as the modeling liquid 10 discharged from the head 50 is mixed with the powder 20, an adhesive included in the powder 20 is dissolved, and the dissolved adhesive molecules bond the particles of the powder 20.

Next, the powder supply process, the flattening process, and the modeling liquid discharging process are repeated to form a new modeling layer. The new modeling layer and the lower modeling layer are integrally combined to compose a part of a three-dimensional modeled product.

The powder supply process, the flattening process, and the modeling liquid discharging process are further repeated a required number of times to complete formation of the three-dimensional modeled product (stereoscopic modeled product).

Figure 7:
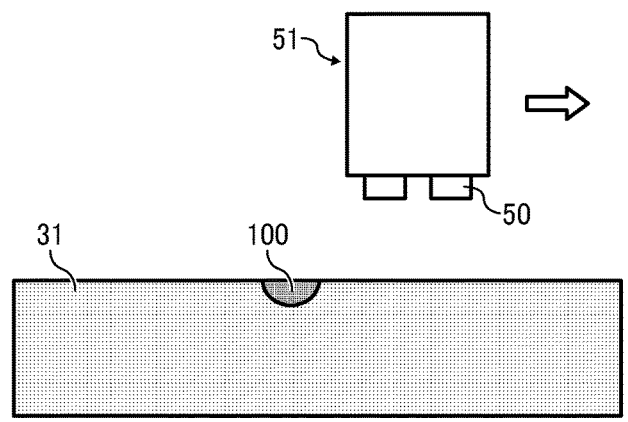
FIG. 7 is an illustration for a situation where a discharged droplet impacts on a powder layer.

A situation where a discharged droplet impacts on the powder layer is described below with reference to FIG. 7. FIG. 7 is an illustration for this situation.

FIG. 7 illustrates a situation where a two-dimensional image data with a pitch of 300×300 dpi (approximately 85 μm) has been generated, a droplet 100 of the modeling liquid has impacted on the powder layer 31 based on the data, and the droplet 100 has permeated the powder layer 31.

The quantity of the droplet 100 is adjusted so that the droplet 100 is just permeable for a depth of 100 μm.

Such a quantity of the droplet 100 can be experimentally determined as follows. First, spread the powder on a glass substrate to form a powder layer having a thickness of 100 μm, and drop a droplet on the powder layer. Observe the glass plate with a camera from the side opposite to the surface on which the droplet is dropped, to determine whether the liquid has permeated the powder layer for a depth of 100 μm. By repeating this experiment while varying the quantity of the droplet, the quantity of the droplet just permeable for a depth of 100 μm can be determined. As a result of the experiment, the quantity of the droplet 100 is adjusted to approximately 200 μl per droplet.

A movement of the powder upon impact of the droplet on the powder layer is described below with reference to FIGS. 8A and 8B.

At the time of flattening (recoating), the powder 20 in the powder layer 31 has a density equivalent to the loose bulk density thereof. This means that the powder 20 contains a lot of voids 32. As an example, a gas-atomized powder PSS316L—20 μm grade, having an average particle diameter of 14 μm, available from Sanyo Special Steel Co., Ltd., has a density of only 3 g/cc, which is 37% of the true density.

Figure 8A:
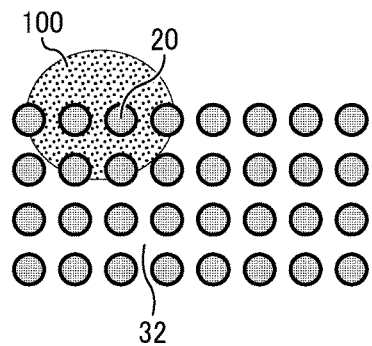
FIGS. 8A and 8B are illustrations for a movement of the powder upon impact of a droplet on the powder layer.
Figure 8B:
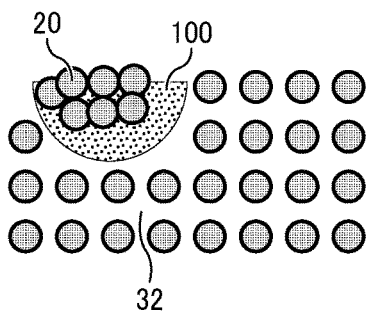

When the droplet 100 is dropped on the powder layer 31 having such a bulk density, as illustrated in FIG. 8A, particles of the powder 20 come close to each other owing to liquid bridge adhesive force, as illustrated in FIG. 8B. Thus, only in the region where the droplet 100 is dropped, the density becomes equivalent to the tapped density (3.6 g/cc, 45% of the true density.) By contrast, the periphery of the region where the droplet 100 is dropped becomes a relatively-low-density sparse region.

A related-art case in which droplets are discharged to adjacent positions on the powder layer is described below with reference to FIGS. 9A and 9B.

Figure 9A:
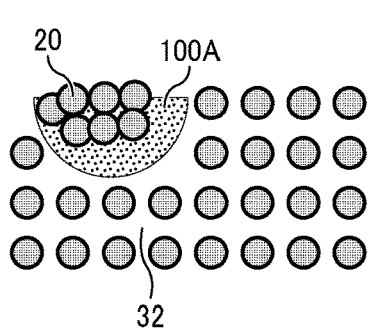
FIGS. 9A and 9B are illustrations for a movement of the powder in a case in which droplets are sequentially discharged to adjacent positions on the powder layer in accordance with a related art.
Figure 9B:
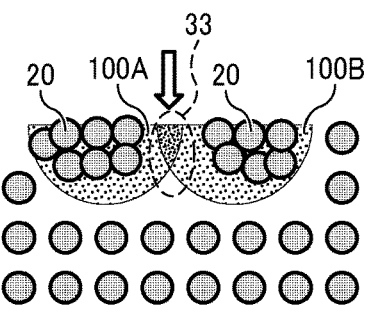

In this related art, after a first droplet (preceding droplet) 100A is discharged to impact on and sufficiently permeate the powder layer 31, as illustrated in FIG. 9A, a second droplet (succeeding droplet) 100B is discharged to impact on a position adjacent to the impact position of the preceding droplet 100A, as illustrated in FIG. 9B.

The impact of the preceding droplet 100A causes rearrangement of the particles of the powder 20, as illustrated in FIG. 9A. Thereafter, the impact of the succeeding droplet 100B also causes rearrangement of the particles of the powder 20, as illustrated in FIG. 9B.

As a result, a void area 33 in which the powder 20 is sparse appears between the impact regions of the preceding droplet 100A and the succeeding droplet 100B.

Since such a void area 33 exists throughout the resulting modeled product, the density of the modeled product becomes nonuniform and low, resulting in poor quality of the modeled product.

On the other hand, a case in which droplets are discharged to adjacent positions on the powder layer in accordance with an embodiment of the present invention is described below with reference to FIGS. 10A to 10D.

In the present embodiment, in the case where the preceding droplet 100A and the succeeding droplet 100B are discharged to impact on adjacent positions on the powder layer, the succeeding droplet 100B is discharged after the preceding droplet 100A is discharged and within a time period in which the impacted preceding droplet 100A and the impacted succeeding droplet 100B come to coalesce with each other.

In the context of the present disclosure, "coalescence" refers to a state in which a preceding droplet and a succeeding droplet are integrated to become one droplet. The time period in which a preceding droplet and a succeeding droplet come to coalesce with each other is equivalent to a time period in which the preceding droplet exists on the powder as a droplet before completely permeating the powder layer.

Figure 10A:
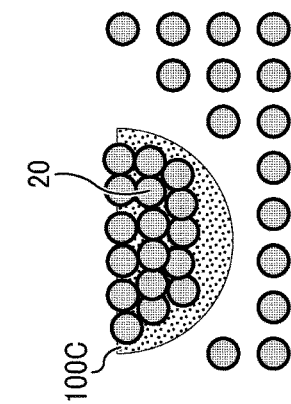
FIGS. 10A to 10D are illustrations for a movement of the powder in a case in which droplets are sequentially discharged to adjacent positions on the powder layer in accordance with an embodiment of the present invention.
Figure 10B:
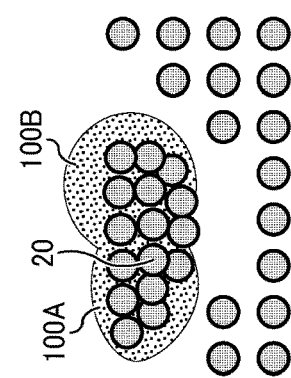
Figure 10C:
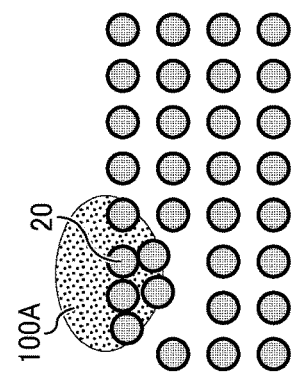

More specifically, upon impact of the preceding droplet 100A on the powder layer 31, as illustrated in FIG. 10A, some particles of the powder 20 move toward the preceding droplet 100A, as illustrated in FIG. 10B. Before the preceding droplet 100A completely permeates the powder layer 31, the succeeding droplet 100B is discharged to impact on a position adjacent to the preceding droplet 100A, as illustrated in FIG. 10C.

Figure 10D:
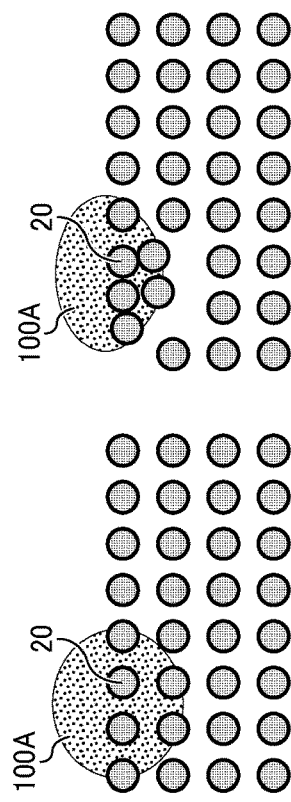

Since the preceding droplet 100A has not completely permeated the powder layer 31 at this time, the succeeding droplet 100B coalesces with the preceding droplet 100A and they become a permeated liquid 100C, as illustrated in FIG. 10D.

The density of the powder 20 in the whole region of the permeated liquid 100C is higher than that in the state illustrated in FIG. 9B.

The time period in which a preceding droplet and a succeeding droplet come to coalesce with each other in the powder layer is described in detail below.

Figure 11:
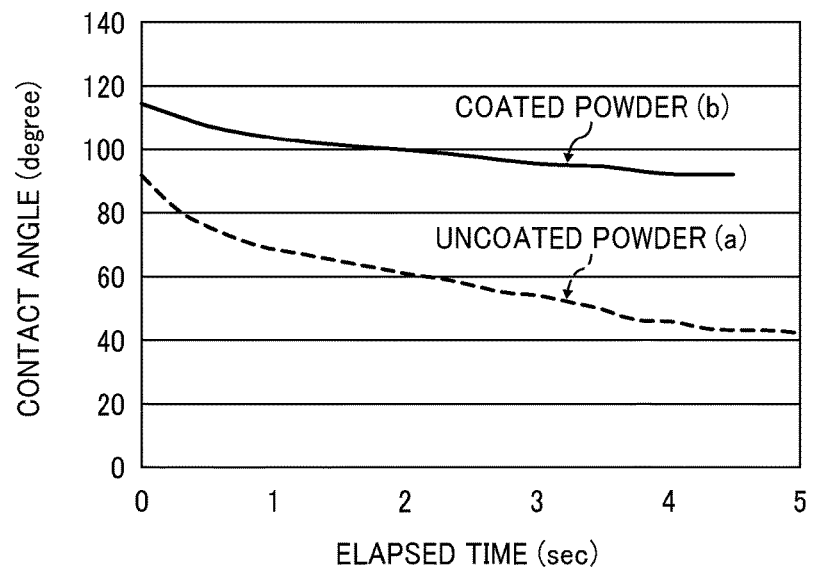
FIG. 11 is a graph showing variations in the contact angle between a powder and a droplet.

First, the static contact angle between a powder and a droplet is described below with reference to FIG. 11. FIG. 11 is a graph showing a measurement result of variation in the contact angle with time.

The rate of permeating the powder layer 31 of the droplet 100 can be visualized and quantified by means of the contact angle between the droplet (of the modeling liquid) and the surface of the powder as follows. Spread the powder on a glass plate to form a thin layer thereof, and drop the droplet on the layer from a needle, while observing the condition with a camera over time, to measure a time variation in the contact angle. The contact angle is measured with an automatic contact angle measuring instrument (DataPhysics OCA200H). As the measurement environment, the temperature is set in the range of 22 to 23° C. and the humidity is set in the range of 45 to 65% RH.

A powder material (hereinafter simply "powder") for use in the stereoscopic modeling in accordance with an embodiment of the present invention is described below.

The powder includes a base material covered with an organic material, and may optionally include other components, if needed. The material covering the base material includes the organic material as a main component, and may optionally include an inorganic material, if needed. The powder is used for a method of manufacturing the stereoscopic modeled product according to an embodiment of the present invention, to be described later.

Base Material

The base material is not limited to a specific material so long as it has the form of a powder or particle. Specific examples of the base material include, but are not limited to, metal, ceramic, carbon, polymer, wood, biocompatible material, and sand. To obtain a high-strength stereoscopic modeled product, metals and ceramics that can be eventually subjected to a sintering process are preferable.

Specific examples of the metal include, but are not limited to, stainless steel (SUS), iron, copper, titanium, and silver. Specific examples of the stainless steel (SUS) include, but are not limited to, SUS316L. Specific examples of the ceramic include, but are not limited to, metal oxides such as silica ($SiO_2$), alumina ($Al_2O_3$), zirconia ($ZrO_2$), and titania ($TiO_2$). Specific examples of the carbon include, but are not limited to, graphite, graphene, carbon nanotube, carbon nanohorn, and fullerene.

Specific examples of the polymer include, but are not limited to, water-insoluble resins. Specific examples of the wood include, but are not limited to, wood chips and celluloses. Specific examples of the biocompatible material include, but are not limited to, polylactic acids and calcium phosphates.

The above-described materials can be used alone or in combination.

Commercially-available particles or powders of the above-described materials can be used as the base material.

Specific examples of commercially-available materials for the base material include, but are not limited to, SUS316L (PSS316L available from Sanyo Special Steel Co., Ltd.), $SiO_2$ (EXCELICA SE-15K available from Tokuyama Corporation), $AlO_2$ (TIMICRON™-5D available from Taimei Chemicals Co., Ltd.), and $ZrO_2$ (TZ-B53 available from Tosoh Corporation).

For the purpose of enhancing the affinity for the organic material, the base material can be subjected to a surface (modification) treatment.

The base material is not limited in average particle diameter. The average particle diameter is preferably in the range of 0.1 to 500 μm, more preferably 5 to 300 μm, and most preferably 15 to 250 μm.

When the average particle diameter is in the range of 0.1 to 500 μm, the base material provides an excellent stereoscopic modeled product productivity and good operability and handling ability. When the average particle diameter is 500 μm or less, a thin layer of the powder can be improved in powder filling rate, thereby suppressing generation of void areas in the resulting stereoscopic modeled product.

The average particle diameter of the base material can be measured with a known particle size analyzer such as MICROTRAC HRA (available from Nikkiso Co., Ltd.).

The base material is not limited in particle size distribution.

The base material is not limited in outer shape, surface area, circularity, fluidity, and wettability.

Organic Material

The organic material is a substance soluble in the modeling liquid and cross-linkable owing to the action of a cross-linker included in the modeling liquid.

The organic material is regarded as being soluble in the modeling liquid when, 1 g of the organic material is mixed and stirred with 100 g of the solvent included in the modeling liquid having a temperature of 30° C., 90% by weight or more of the organic material is dissolved in the modeling liquid.

The 4% (by weight) solution of the organic material preferably has a viscosity of 40 mPa·s or less, more preferably in the range of 1 to 35 mPa·s, and most preferably in the range of 5 to 30 mPa·s, at 20° C.

When the viscosity is 40 mPa·s or less, the resulting cured product (stereoscopic modeled product), composed of the layers formed by adding the modeling liquid to the powder, has an improved strength. The cured product can be subjected to a succeeding process such as sintering, or simply handled, without losing its shape. Additionally, the resulting cured product (stereoscopic modeled product), composed of the layers formed by adding the modeling liquid to the powder, has an improved dimension accuracy. The viscosity can be measured based on a method according to JIS K7117.

The organic material is not limited to a specific substance. In view of handleability and environmental load reduction, preferably, the organic material is water-soluble. Specific examples of the organic material which are water-soluble include, but are not limited to, water-soluble resins and water-soluble prepolymers.

When the powder includes such a water-soluble organic material, the modeling liquid may employ an aqueous medium as its medium. When such a powder is discarded or recycled, the organic material and the base material can be easily separated by a water treatment.

Specific examples of the water-soluble resin include, but are not limited to, polyvinyl alcohol resin, polyacrylic acid resin, cellulose resin, starch, gelatin, vinyl resin, amide resin, imide resin, acrylic resin, and polyethylene glycol.

The water-soluble resin may be either a homopolymer or a heteropolymer (copolymer), may be modified, may have a functional group, and/or may be in the form of a salt, so long as it has water solubility.

Specific examples of the polyvinyl alcohol resin include, but are not limited to, polyvinyl alcohols, modified polyvinyl alcohols (e.g., acetoacetyl-group-modified polyvinyl alcohol, acetyl-group-modified polyvinyl alcohol, silicone-modified polyvinyl alcohol), and butanediol-vinyl alcohol copolymers.

Specific examples of the polyacrylic acid resin include, but are not limited to, polyacrylic acids and polyacrylic acid salts such as sodium polyacrylate. Specific examples of the cellulose resin include, but are not limited to, cellulose and carboxymethyl cellulose (CMC). Specific examples of the acrylic resin include, but are not limited to, polyacrylic acids and acrylic acid-maleic anhydride copolymers.

Specific examples of the water-soluble prepolymers include, but are not limited to, adhesive water-soluble isocyanate prepolymers that may be included in water sealants.

Specific examples of the organic material which are not water-soluble include, but are not limited to: resins such as acrylic resin, maleic acid resin, silicone resin, butyral resin, polyester, polyvinyl acetate, vinyl chloride-vinyl acetate copolymer, polyethylene, polypropylene, polyacetal, ethylene-vinyl acetate copolymer, ethylene-acrylic acid copolymer, ethylene-methacrylic acid copolymer, α-olefin-maleic anhydride copolymer and esterification products thereof, polystyrene, polyacrylate, polymethacrylate, copolymer of α-olefin, maleic anhydride, and a vinyl-group-containing monomer, styrene-maleic anhydride copolymer, styrene-acrylate copolymer, styrene-methacrylate copolymer, polyamide, epoxy resin, xylene resin, ketone resin, petroleum resin, rosin and derivatives thereof, coumarone-indene resin, terpene resin, and polyurethane resin; synthetic rubbers such as styrene-butadiene rubber, polyvinyl butyral, nitrile rubber, acrylic rubber, and ethylene-propylene rubber; and nitrocellulose.

Among the above organic materials, those having a cross-linkable functional group are preferable. The cross-linkable functional group is not limited in configuration. Specific examples of the cross-linkable functional group include, but are not limited to, hydroxyl group, carboxyl group, amide group, phosphoric acid group, thiol group, acetoacetyl group, and ether bond.

Advantageously, the organic material having a cross-linkable functional group easily cross-links to form a hardened product (stereoscopic modeled product).

Among the above organic materials, polyvinyl alcohol resins having an average degree of polymerization in the range of 400 to 1,100 are preferable. In particular, such polyvinyl alcohol resins having a cross-linkable functional group are more preferable. More specifically, such polyvinyl alcohol resins modified with acetoacetyl group are most preferable. Owing to the action of a metal in the cross-linker included in the modeling liquid, the acetoacetyl group in the polyvinyl alcohol resin can easily form a complicated three-dimensional network structure (cross-linking structure) with the metal. In other words, the acetoacetyl group has excellent cross-linking reactivity. The resulting product has excellent flexural strength.

Such acetoacetyl-group-modified polyvinyl alcohol resins, each having different degrees of viscosity and saponification, may be used alone or in combination. In particular, acetoacetyl-group-modified polyvinyl alcohol resins having an average degree of polymerization in the range of 400 to 1,100 are preferable.

The above-described organic materials can be used alone or in combination, and can be either synthetic products or commercially-available products.

Specific examples of commercially-available products for the organic material include, but are not limited to, polyvinyl alcohols (PVA-205C and PVA-220C available from Kuraray Co., Ltd.), a polyacrylic acid (JURYMER® AC-10 available from Toagosei Co., Ltd.), a sodium polyacrylate (JURYMER® AC-103P available from Toagosei Co., Ltd.), acetoacetyl-group-modified polyvinyl alcohols (GOHSENX™ Z-300, GOHSENX™ Z-100, GOHSENX™ Z-200, GOHSENX™ Z-205, GOHSENX™ Z-210, and GOHSENX™ Z-220 available from The Nippon Synthetic Chemical Industry Co., Ltd.), carboxyl-group-modified polyvinyl alcohols (GOHSENX™ T-330, GOHSENX™ T-350, and GOHSENX™ T-330T available from The Nippon Synthetic Chemical Industry Co., Ltd.), a butanediol-vinyl alcohol copolymer (Nichigo G-Polymer™ OKS-8041 available from The Nippon Synthetic Chemical Industry Co., Ltd.), a diacetone-acrylicamide-modified polyvinyl alcohol (DF-05 available from Japan Vam & Poval Co., Ltd.), a sodium carboxymethyl cellulose (CELLOGEN® 5A and CELLOGEN® 6A available from DKS Co., Ltd.), a starch (PSS-5 available from Sanwa Starch Co., Ltd.), and a gelatin (beMatrix® gelatin available from Nitta Gelatin Inc.).

The average thickness of the organic material covering the base material is preferably in the range of 5 to 1,000 nm, more preferably 5 to 500 nm, much more preferably 50 to 300 nm, and most preferably 100 to 200 nm.

According to the present embodiment, the thickness of the covering layer can be smaller than that of conventional powders owing to the curing action of the cross-linker. The covering layer has a good balance of strength and accuracy even when being thin.

When the average thickness of the covering layer is 5 nm or more, the resulting cured product (stereoscopic modeled product), composed of the layers formed by adding the modeling liquid to the powder, has an improved strength. The cured product can be subjected to a succeeding process such as sintering, or simply handled, without losing its shape. When the average thickness of the covering layer is 1,000 nm or less, the resulting cured product (stereoscopic modeled product), composed of the layers formed by adding the modeling liquid to the powder, has an improved dimension accuracy.

The average thickness can be measured by, for example, embedding the powder in an acrylic rein or the like resin, exposing a surface of the base material by means of etching or the like, and observing the surface with a scanning tunneling microscope (STM), atomic force microscope (AFM), scanning electron microscope (SEM), or the like microscope.

The coverage (area ratio) of the organic material on the surface of the base material is preferably 15% or more, more preferably 50% or more, and most preferably 80% or more.

When the coverage is 15% or more, the resulting cured product (stereoscopic modeled product), composed of the layers formed by adding the modeling liquid to the powder, has an improved strength. The cured product can be subjected to a succeeding process such as sintering, or simply handled, without losing its shape. Additionally, when the coverage is 15% or more, the resulting cured product (stereoscopic modeled product), composed of the layers formed by adding the modeling liquid to the powder, has an improved dimension accuracy.

The coverage can be determined by, for example, observing a photograph of the powder, calculating the area ratio (%) of portions covered with the organic material to the whole surface of each powder particle in a two-dimensional plane in the photograph, and averaging the calculated area ratios. Portions covered with the organic material can be detected by means of elemental mapping, performed by energy dispersive X-ray spectrometry such as SEM-EDS.

Other Components

The powder may include other components, such a fluidizer, a filler, a leveling agent, and a sintering auxiliary agent, if needed.

The powder including a fluidizer is advantageous in that the powder layers can be easily and efficiently formed. The powder including a filler is advantageous in that the resulting cured product (stereoscopic modeled product) is likely to contain few void areas. The powder including a leveling agent is advantageous in that the powder has an improved wettability and handleability. The powder including a sintering auxiliary agent is advantageous in that the resulting cured product (stereoscopic modeled product) can be sintered at lower temperatures.

Production of Powder

A method of producing the powder is not limited to any specific method. The powder can be produced by, for example, covering the base material with the organic material by a known covering method. The covering method is not limited to any specific method.

Specific examples of the covering method include, but are not limited to, rolling fluidizing coating methods, spray drying methods, stirring mixing adding methods, dipping methods, and kneader coating methods. Such covering methods can be performed by various commercially-available coaters or granulators.

Properties of Powder

The powder is not limited in average particle diameter. The average particle diameter of the powder is preferably in the range of 3 to 250 µm, more preferably 3 to 200 µm, much more preferably 5 to 150 µm, and most preferably 10 to 85 µm.

When the average particle diameter of the powder is 3 µm or more, the fluidity of the powder is improved. Thus, the powder layer can be easily formed and the surfaces of the laminating layers become smooth. This leads to improvements in productivity, handleability, and dimension accuracy of the resulting stereoscopic modeled product.

When the average particle diameter of the powder is 250 µm or less, the space between the powder particles becomes small, thus reducing the void ratio in the resulting stereoscopic modeled product and improving the strength of the stereoscopic modeled product. Accordingly, when the average particle diameter is in the range of 3 to 250 µm, dimension accuracy and strength can achieve a good balance.

The powder is not limited in particle size distribution.

The powder preferably has an angle of repose of 60 degrees or less, more preferably 50 degrees or less, and most preferably 40 degrees or less. When the angle of repose is 60 degrees or less, the powder can be efficiently and stably placed on a desired position a substrate. The angle of repose can be measured with a powder properties measuring instrument (e.g., Powder Characteristics Tester PT-N available from Hosokawa Micron Corporation).

The modeling liquid in accordance with an embodiment of the present invention is described below.

The modeling liquid includes a cross-linker that is cross-linkable with the organic material. The modeling liquid further includes a medium (solvent) that dissolves the organic material, a component that accelerates the dissolution, and a stabilizer that keeps storage stability of the modeling liquid. The modeling liquid may further include other components, if needed.

Upon addition of the modeling liquid to the organic material, the organic material dissolves therein, and at the same time, cross-links by the action of the cross-linker included in the modeling liquid.

The modeling liquid preferably has a viscosity of 25 mPa·s or less, more preferably in the range of 3 to 20 mPa·s, at 25° C. When the viscosity is 25 mPa·s or less at 25° C., the modeling liquid can be reliably discharged.

It is preferable that, after the modeling liquid is left at rest for three days at 50° C., the change rate in viscosity of the modeling liquid is less than 20%. When the change rate in viscosity of the modeling liquid is 20% or more, the modeling liquid may be discharged unstably.

Medium

The medium is not limited to a specific substance so long as it is capable of dissolving the organic material that is covering the base material of the powder. Specific examples of the medium include, but are not limited to: hydrophilic media such as water, alcohols such as ethanol, ethers, and ketones; aliphatic hydrocarbons; ether solvents such as glycol ether; ester solvents such as ethyl acetate; ketone solvents such as methyl ethyl ketone; and higher alcohols.

In view of environmental load reduction and discharge stability (a smaller time variation in viscosity) of the modeling liquid, aqueous media are preferable, and water is most preferable. The aqueous medium may be a mixture of water and a slight amount of an aqueous component other than water such as an alcohol. In the case where the modeling liquid includes an aqueous medium as the medium, the organic material preferably includes a water-soluble organic material as a main component.

Specific examples of the hydrophilic media include, but are not limited to, water, alcohols such as ethanol, ethers, and ketones.

Cross-Linker

The cross-linker is not limited to any specific substance so long as it is capable of cross-linking with the organic material. Specific examples of the cross-linker include, but are not limited to, metal salts, metal complexes, organic zirconium compounds, organic titanium compounds, and chelate agents.

Specific examples of the organic zirconium compounds include, but are not limited to, zirconium oxychloride, ammonium zirconium carbonate, and ammonium zirconium lactate.

Specific examples of the organic titanium compounds include, but are not limited to, titanium acylate and titanium alkoxide.

The above-described materials can be used alone or in combination. Among the above-described materials, metal salts are most preferable.

Specific examples of the metal salts include, but are not limited to, those generating a cationic metal having 2 or more valences in water by electrolytic dissociation. Specific examples of such metal salts include, but are not limited to, zirconium oxychloride octahydrate (4 valences), aluminum hydroxide (3 valences), magnesium hydroxide (2 valences), titanium lactate ammonium salt (4 valences), basic aluminum acetate (3 valences), zirconium carbonate ammonium salt (4 valences), and triethanolamine titanate (4 valences).

Commercially-available metal salts can also be used. Specific examples of commercially-available metal salts include, but are not limited to, a zirconium oxychloride octahydrate (zirconium oxychloride available from Daiichi Kigenso Kagaku Kogyo Co., Ltd.), an aluminum hydroxide (available from Wako Pure Chemical Industries, Ltd.), a magnesium hydroxide (available from Wako Pure Chemical Industries, Ltd.), a titanium lactate ammonium salt (ORGATIX TC-300 available from Matsumoto Fine Chemical Co., Ltd.), a zirconium lactate ammonium salt (ORGATIX ZC-300 available from Matsumoto Fine Chemical Co., Ltd.), a basic aluminum acetate (available from Wako Pure Chemical Industries, Ltd.), a bisvinylsulfone compound (VS-B(K-FJC) available from FUJIFILM Finechemicals Co., Ltd.), a zirconium carbonate ammonium salt (Zircosol AC-20 available from Daiichi Kigenso Kagaku Kogyo Co., Ltd.), and a triethanolamine titanate (ORGATIX TC-400 available from Matsumoto Fine Chemical Co., Ltd.).

Among the above compounds, zirconium carbonate ammonium salt is most referable since it provides the resulting stereoscopic modeled product with excellent strength.

Surfactant

The modeling liquid may include a surfactant for the purpose of adjusting the surface tension.

Specific examples of the surfactant include, but are not limited to, anionic surfactants, nonionic surfactants, and ampholytic surfactants.

A suitable surfactant is so selected that the dispersion stability is not degraded depending on the combination of wetting agent and water-soluble organic solvent.

The effect of the cross-linker according the present embodiment is described below with reference to FIG. 21.

Figure 21:
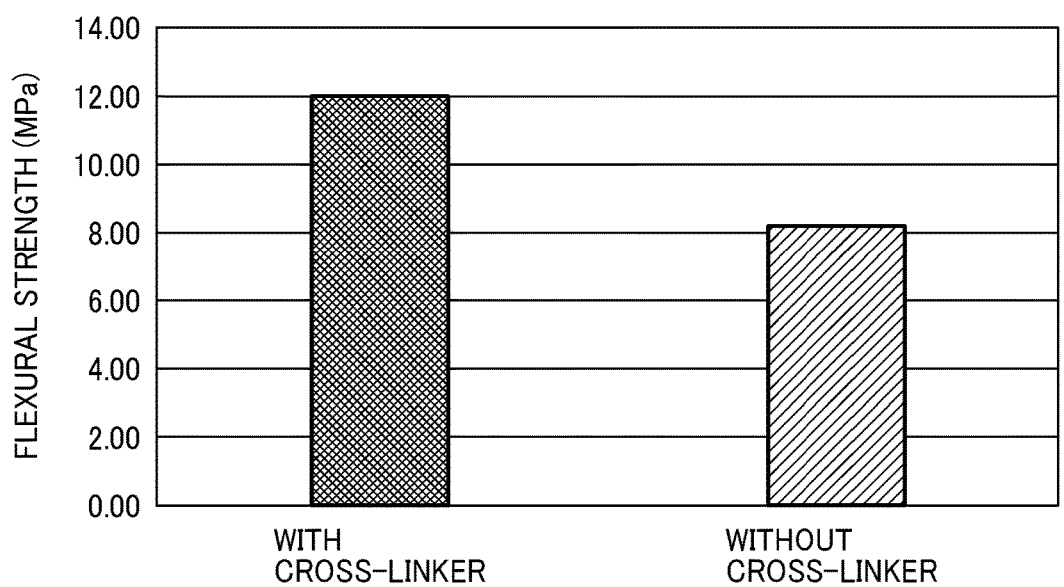
FIG. 21 is a graph showing the effect of a cross-linker on the quality of a modeled product.

FIG. 21 is a graph showing three-point flexural strength of modeled products each having a length of 70 mm, a width of 10 mm, and a thickness of 3 mm. The flexural strength is measured with a Precision Universal Tester AG-1, available from Shimadzu Corporation, using a 1-kN load cell.

A stainless steel powder (gas-atomized powder PSS316L—20 µm grade, available from Sanyo Special Steel Co., Ltd.) is used as the base material, Z100 is used as the organic material covering the base material, and Zircosol AC-20 is used as the cross-linker. By using the cross-linker, the flexural strength is increased from 8.3 MPa to 11.9 MPa, i.e., by approximately 43%.

In this flexural test, for the purpose of directly evaluating the effect of materials, the modeled products are formed as follows, not by means of powder additive manufacturing: kneading the mixture of the above materials at a predetermined ratio to prepare a slurry, pouring the slurry into a silicone mold, and drying and solidifying the slurry at 100° C. for 2 hours.

On the other hand, another three-point flexural test is conducted in the same manner to evaluate modeled products prepared by means of powder additive manufacturing each having a length of 35 mm, a width of 10 mm, and a thickness of 3 mm. As a result, by using the cross-linker, the flexural strength is increased from 1.62 MPa to 3.5 MPa, i.e., becomes twice. The additive manufacturing conditions are set as follows: a single layer thickness is 102 µm, the manufacturing resolution is 300×300 dpi, and the modeling liquid amount is 180 pl/dot.

Referring back to FIG. 11, an uncoated powder (a) is constantly having high contact angles, including the initial static contact angle, than a coated powder (b). This indicates that the rate of permeating the powder layer 31 of the modeling liquid droplet can be controlled by reforming the surface of the powder or adjusting the properties of the modeling liquid. In particular, the contact angle becomes higher in the case where the powder is coated with the organic material and the modeling liquid is aqueous.

Next, how the contact angle between the powder and the droplet effects on the rate of permeating the powder layer of the droplet is described below with reference to FIGS. 12 and 13A-13B.

Figure 12:
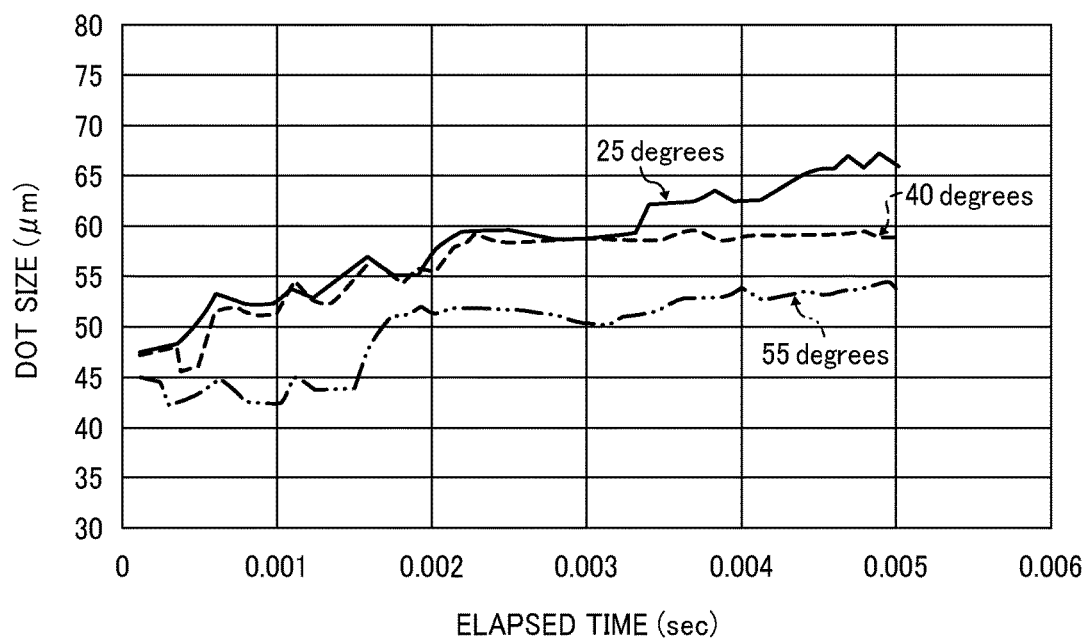
FIG. 12 is a graph showing a relation between the dot size of a droplet permeating a powder layer and the elapsed time.

FIG. 12 is a graph showing a relation between the dot size of a modeling liquid droplet permeating the powder layer in the depth direction, on the vertical axis, and the elapsed time, on the horizontal axis.

FIG. 12 indicates that as the static contact angle between the powder and the droplet becomes larger (in the order of 25 degrees, 40 degrees, and 55 degrees), the dot size of the droplet in the depth direction becomes smaller, when comparing them at the same elapsed time. In other words, the larger the contact angle, the smaller the rate of permeating in the depth direction.

Figure 13A:
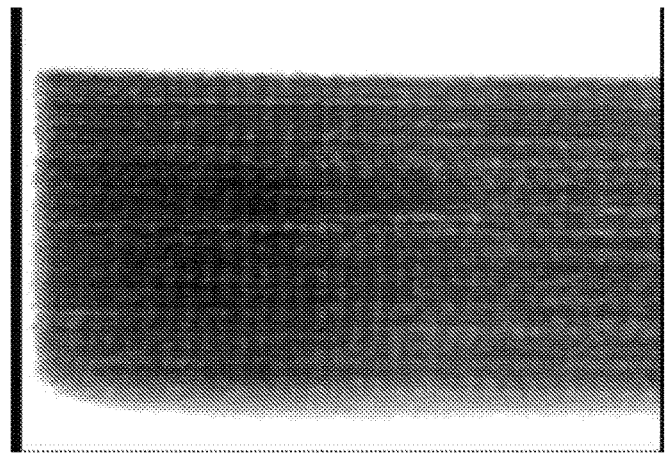
FIGS. 13A and 13B are transmission X-ray images of product modeled with various powders.
Figure 13B:
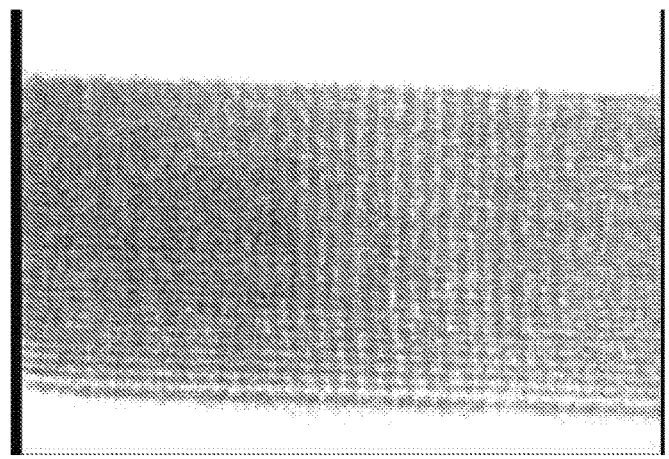

FIG. 13A is a transmission X-ray image of a product modeled with a powder having a large (high) contact angle (e.g., the coated powder (b) illustrated in FIG. 11). FIG. 13B is a transmission X-ray image of a product modeled with a powder having a small (low) contact angle (e.g., the uncoated powder (a) illustrated in FIG. 11).

In these transmission X-ray images, the darker color indicates the higher density. The density of the modeled product illustrated in FIG. 13A is 4.59 g/cc when measured by an Archimedes' method (using MS403S/02 and a density measuring kit MS for a 0.1-mg and 1-mg balance available from Mettler-Toledo International Inc.) The density of the modeled product illustrated in FIG. 13B is 3.25 g/cc when measured in the same manner.

These results indicate that the contact angle between the powder and the droplet exerts an influence on the density of the modeled product.

The time interval between the preceding droplet and the succeeding droplet to impact on adjacent positions on the powder layer is described below with reference to FIGS. 14A-14C, 15A-15D, and 16.

Figure 14A:
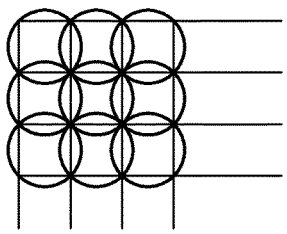
FIGS. 14A to 14C are illustrations of the resolution for explaining the time interval between a preceding droplet and a succeeding droplet to impact on adjacent positions on a powder layer.

When the nozzle resolution of the liquid discharge head 50 is 300 dpi (approximately 84.65 μm), by properly setting the moving speed of the liquid discharge head 50 in the main scanning direction (hereinafter "main scanning speed") and the drive frequency (hereinafter "discharge frequency"), 300×300 dpi pixels are formed, as illustrated in FIG. 14A. As an example, droplets are discharged at a main scanning speed of 1.1851 m/s and a drive frequency of 14 kHz.

In this case, two adjacent droplets are allowed to impact with the time interval being 1/14 kHz=71.4 μs.

The time interval can be arbitrarily controlled by adjusting the main scanning speed and the drive frequency.

Figure 14B:
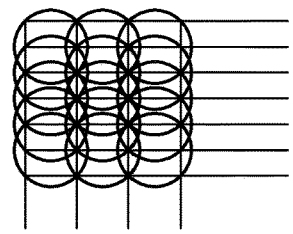
Figure 14C:
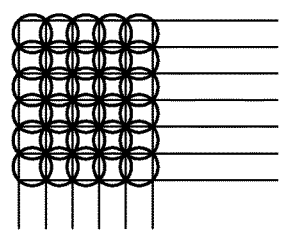

To obtain 300×600 dpi pixels or 600×600 dpi pixels respectively illustrated in FIG. 14B or 14C, each of which has a higher resolution than the nozzle resolution, scanning should be performed multiple times.

For example, to obtain 600×600 dpi pixels, dots are sequentially formed in the order corresponding to the illustrations of FIGS. 15A, 15B, 15C, and 15D. Therefore, the time interval between impacts of two adjacent droplets is longer than one scan cycle.

When the head scanning distance is 300 mm and the main scanning speed is 1.1851 m/s, it takes 506 ms at least. In the case of one-way printing, the head should reciprocate once (move the main scanning distance twice, i.e., 600 mm). FIG. 16 is a table showing various cases in which the drive frequency is varied.

Figures 17, 18:
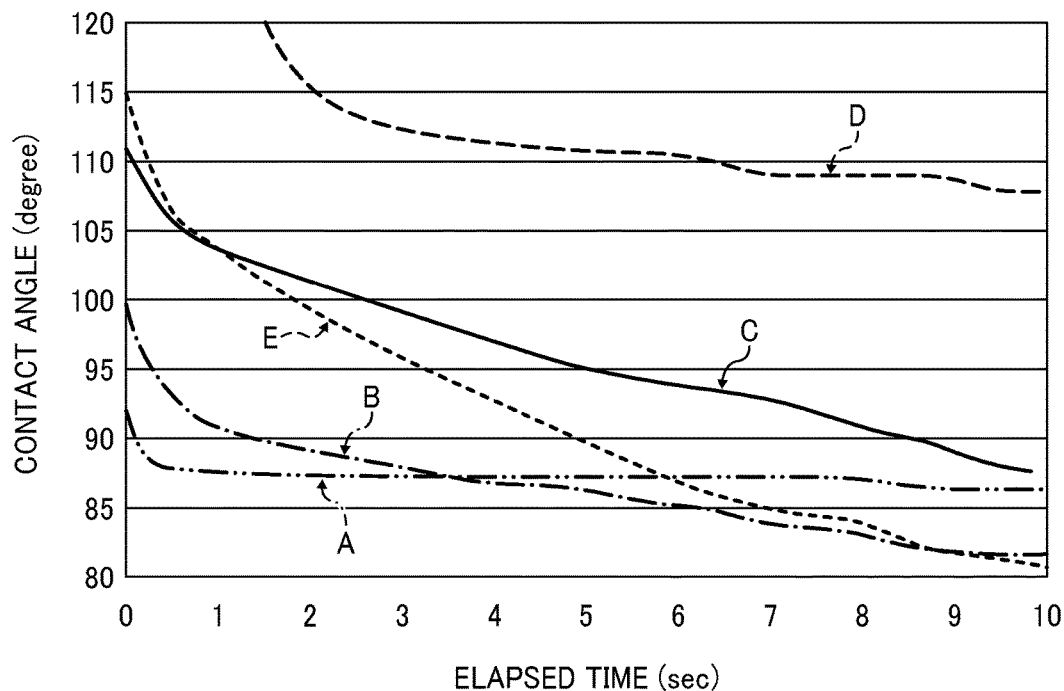
FIG. 17 is a graph showing time variations of the contact angle between a powder and a modeling liquid droplet.
FIG. 18 is a table showing a relation between the contact angle and the density of modeled products.

The coalescence of adjacent droplets, the contact angle therebetween, and the time interval between the two droplets is described below with reference to FIGS. 17 and 18. FIG. 17 is a graph showing time variations of the contact angle between a powder and a modeling liquid droplet, in each of five combinations A to E, after impact of each droplet on each powder layer. FIG. 18 is a table showing the densities of the products modeled using the combinations A to E under the condition that the impact time interval is approximately 3.5 seconds and 300×300 dpi pixels are formed by 4 times of scanning. The impact time interval corresponds to the discharge time interval.

The compositions of the combinations A to E are listed below. All the combinations include SUS316L (PSS316L— 20 μm or less grade, available from Sanyo Special Steel Co., Ltd.) as the base material.

Combination A
 Organic Material: GOHSENX™ Z-100
 Surfactant: None
 Organic Solvent in Modeling Liquid: 1,2-Propanediol
Combination B
 Organic Material: DF05
 Surfactant: None
 Organic Solvent in Modeling Liquid: 1,2-Propanediol
Combination C
 Organic Material: GOHSENX™ Z-100
 Surfactant: Methyl Cellulose (SMC-25 available from Shin-Etsu Chemical Co., Ltd.)
 Organic Solvent in Modeling Liquid: 3-Methyl-1,3-butanediol
Combination D
 Organic Material: GOHSENX™ Z-100
 Surfactant: FTERGENT PF310 (available from NEOS COMPANY LIMITED)
 Organic Solvent in Modeling Liquid: 1,2-Propanediol
Combination E
 Organic Material: GOHSENX™ Z-100
 Surfactant: None
 Organic Solvent in Modeling Liquid: 3-Methyl-1,3-butanediol The surfactants are added to the organic materials for the purpose of suppressing the powder particles from adhering or fusing to each other. In this experiment, there is a tendency that addition of the surfactants to the organic materials increases the density of the modeled products. There is another tendency that 3-methyl-1,3-butanediol, as the modeling liquid solvent, more increases the density of the modeled product than the 1,2-propanediol does. Suitable combinations are not limited to the above-described combinations, and can be properly selected according to the droplet impact time interval.

These results indicate that when two adjacent droplets are allowed to impact on the powder layer under the condition that the contact angle between the powder and the modeling liquid droplet is greater than 90 degrees (as is the case with the combinations C, D, and E), more preferably greater than 90 degrees and less than 110 degrees (as is the case with the combinations C and E), the resulting modeled product has a high density.

Accordingly, when the succeeding droplet is discharged in a time period within which the contact angle between the powder and the preceding droplet remains greater than 90 degrees, the preceding droplet and the succeeding droplet reliably coalesce with each other to enhance the density of the resulting modeled product. In particular, when the succeeding droplet is discharged in a time period within which the contact angle between the powder and the preceding droplet remains greater than 90 degrees and less than 110 degrees, the preceding droplet and the succeeding droplet more reliably coalesce with each other to enhance the density of the resulting modeled product.

When the initial static contact angle between the powder and the modeling liquid is in excess of 110 degrees, the preceding droplet and the succeeding droplet can easily coalesce with each other, even when the impact time interval therebetween is relatively long, to enhance the density of the resulting modeled product.

In the case where 300×300 dpi pixels are formed by 1 time of scanning, adjacent droplets are more accelerated to coalesce with each other than in the case where 300×300 dpi pixels are formed by 4 times of scanning, thus providing a modeled product having a higher strength. The inventors of the present invention have found that the use of a cross-linker drastically improves the flexural strength of the resulting molded product. Specifically, a product modeled with a modeling liquid including a cross-linker by 1 time of scanning has a flexural strength of 13.8 MPa, while a product modeled with a modeling liquid without cross-linker by 4 times of scanning has a flexural strength of 3.3 MPa.

Accordingly, in the case where the preceding droplet and the succeeding droplet are sequentially discharged to adjacent positions on the powder layer, and the succeeding droplet is discharged in a time period within which the contact angle between the impacted preceding droplet and the powder in the powder layer remains greater than 90 degrees, the resulting stereoscopic modeled product contains less local voids, the density unevenness is reduced, and the overall quality is improved.

The above modeling operation in which the preceding droplet and the succeeding droplet are sequentially discharged to adjacent positions on the powder layer, and the succeeding droplet is discharged in a time period within which the contact angle between the impacted preceding droplet and the powder in the powder layer remains greater than 90 degrees, is executed by a computer according to a program.

Figure 19:
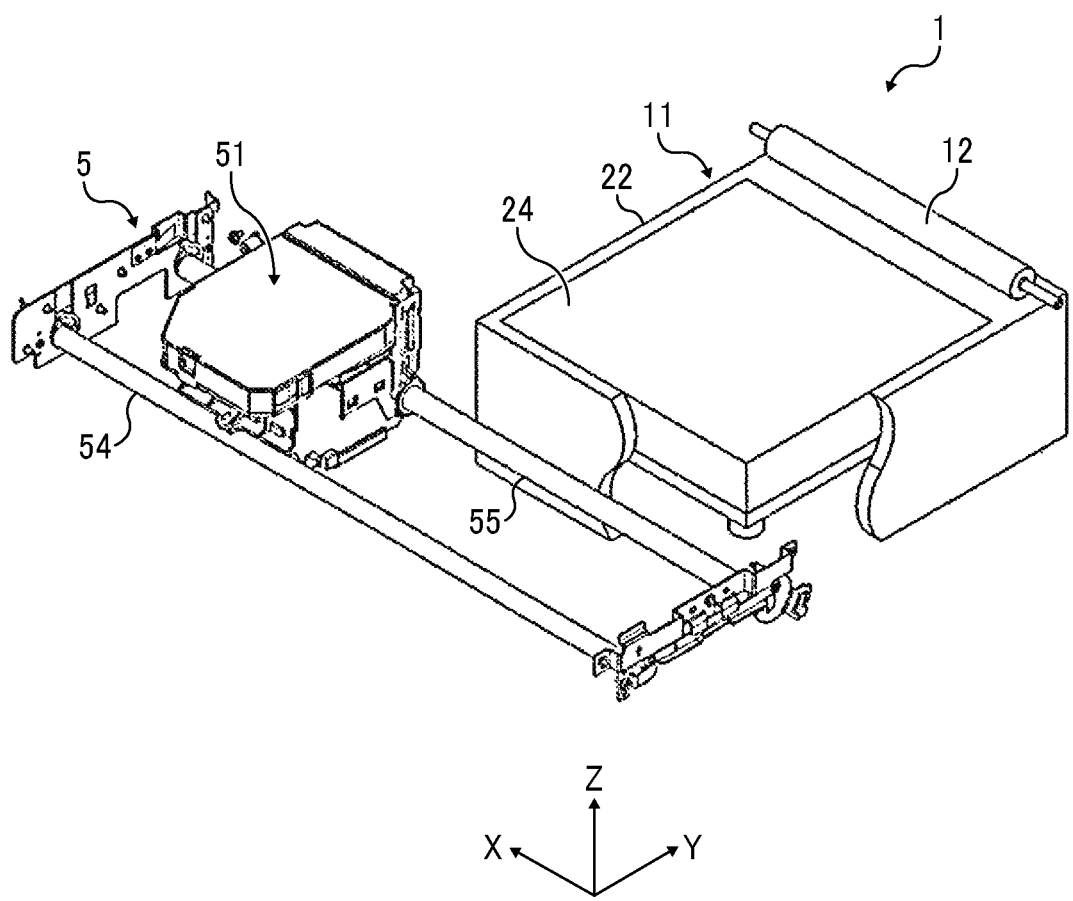
FIG. 19 is a perspective view of the major part of a stereoscopic modeling apparatus in accordance with another embodiment of the present invention.
Figure 20A:
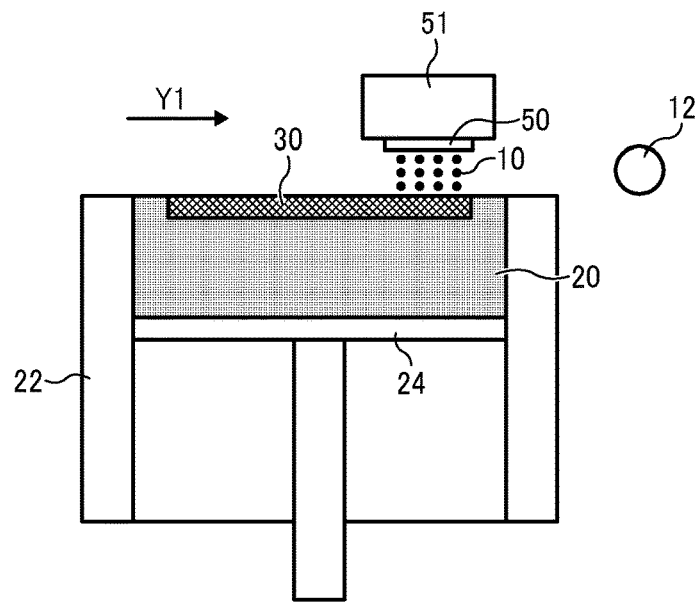
FIGS. 20A and 20B are cross-sectional views of of the major part of the stereoscopic modeling apparatus showing a modeling flow.
Figure 20B:
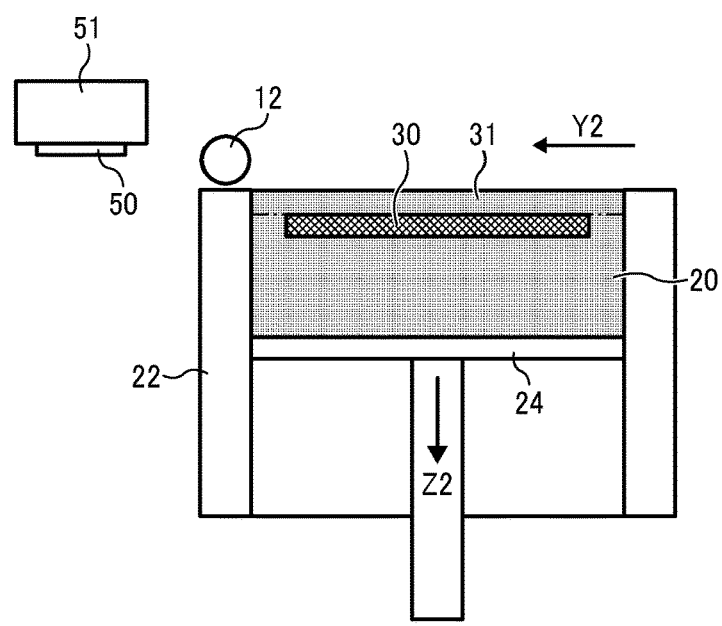

A stereoscopic modeling apparatus in accordance with a second embodiment of the present invention is described below with reference to FIGS. 19 and 20A-20B. FIG. 19 is a perspective view of the major part of the stereoscopic modeling apparatus. FIGS. 20A and 20B are cross-sectional views of of the major part of the stereoscopic modeling apparatus showing a modeling flow.

This stereoscopic modeling apparatus is of a powder additive manufacturing apparatus. Similar to the stereoscopic modeling apparatus according to the first embodiment, this stereoscopic modeling apparatus includes the modeling part 1 to form a modeling layer in which powder particles are bonded, and the modeling unit 5 to discharge droplets of a modeling liquid to the modeling part 1 to model a stereoscopic modeled product.

The modeling part 1 includes the modeling tank 22 only. A powder supplier supplies powder to the modeling tank 22.

In the modeling unit 5, the discharge unit 51 is supported by the guides 54 and 55 to be reciprocatable in the direction indicated by arrow X (i.e., main scanning direction).

The other parts of the stereoscopic modeling apparatus have the same configuration as the stereoscopic modeling apparatus according to the first embodiment.

As illustrated in FIG. 20A, the head 50 of the discharge unit 51 discharges the modeling liquid 10 in the form of droplets on the powder 20 supplied on the modeling stage 24 of the modeling tank 22 to form a next modeling layer 30.

The discharge unit 51 is moved in the main scanning direction to perform a modeling operation corresponding to one scanning region, and then the modeling unit 5 is moved in the sub-scanning direction (indicated by arrow Y1) to perform the modeling operation corresponding to next one scanning region. This operation is repeated to form a single modeling layer 30. After formation of the single modeling layer 30, the modeling unit 5 is returned to an upstream side relative to the sub-scanning direction, as illustrated in FIG. 20B.

Next, to form a next modeling layer 30 on the above-formed modeling layer 30, the modeling stage 24 of the modeling tank 22 is lowered in the direction indicated by arrow Z2 by the distance corresponding to the thickness of the single layer.

Next, a powder supplier supplies the powder 20 to the modeling tank 22, as illustrated in FIG. 20B. The flattening roller 12 is moved in the direction indicated by arrow Y2 along the stage surface of the modeling stage 24 of the modeling tank 22, while rotating. Thus, the powder layer 31 having a predetermined thickness is formed on the modeling layer 30 on the modeling stage 24. (The flattening process)

Next, the head 50 of the discharge unit 51 discharges the modeling liquid 10 in the form of droplets to form a next modeling layer 30.

Formation of the powder layer 31 and solidification of the powder 20, by means of discharging of the modeling liquid 10, are repeated to sequentially laminate the modeling layers 30 to form a stereoscopic modeled product.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A stereoscopic modeling apparatus, comprising:
a modeling part to form a powder layer with a powder;
a modeling unit to discharge droplets of a modeling liquid on the powder layer to form a modeling layer in which particles of the powder are bonded; and
a controller to cause the modeling part and the modeling unit to repeat forming the powder layer and the modeling layer, respectively, to sequentially laminate the modeling layer to form a stereoscopic modeled product, wherein the droplets include a preceding droplet and a succeeding droplet, the modeling unit being configured to sequentially discharge the preceding droplet and the succeeding droplet to adjacent positions on the powder layer, and the modeling unit being configured to discharge the succeeding droplet after the preceding droplet is discharged and within a time period in which a contact angle between the preceding droplet impacted on the powder layer and the powder in the powder layer remains greater than 90 degrees.

2. The stereoscopic modeling apparatus of claim 1, wherein the modeling unit is configured to discharge the succeeding droplet after the preceding droplet is discharged and within a time period in which the contact angle remains greater than 90 degrees and less than 110 degrees.

3. The stereoscopic modeling apparatus of claim 2, wherein the modeling unit is configured to initially discharge droplets of the modeling liquid on the powder layer at an initial static contact angle, the initial static contact angle between the modeling liquid and the powder in the powder layer being 110 degrees or more.

4. The stereoscopic modeling apparatus of claim 1, wherein the modeling part is configured to form the powder layer with a powder including:

a base material; and
an organic material covering the base material.

5. The stereoscopic modeling apparatus of claim 4, wherein the modeling unit is configured to discharge droplets of the modeling liquid, the modeling liquid-including a cross-linker cross-linkable with the organic material.

6. The stereoscopic modeling apparatus claim 1, wherein the modeling unit includes at least one liquid discharge head, configured to discharge droplets of a modeling liquid on the powder layer.

7. The stereoscopic modeling apparatus of claim 1, wherein the modeling unit includes a plurality of liquid discharge heads, configured to discharge droplets of a modeling liquid on the powder layer.

8. The stereoscopic modeling apparatus claim 2, wherein the modeling unit includes a plurality of liquid discharge heads, configured to discharge droplets of a modeling liquid on the powder layer.

9. The stereoscopic modeling apparatus claim 3, wherein the modeling unit includes a plurality of liquid discharge heads, configured to discharge droplets of a modeling liquid on the powder layer.

* * * * *